(12) United States Patent
Roth et al.

(10) Patent No.: US 9,288,208 B1
(45) Date of Patent: Mar. 15, 2016

(54) CRYPTOGRAPHIC KEY ESCROW

(71) Applicant: AMAZON TECHNOLOGIES, INC., Reno, NV (US)

(72) Inventors: Gregory Branchek Roth, Seattle, WA (US); Graeme David Baer, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 179 days.

(21) Appl. No.: 14/020,494

(22) Filed: Sep. 6, 2013

(51) Int. Cl.
| | |
|---|---|
| *G06F 21/00* | (2013.01) |
| *H04L 29/06* | (2006.01) |
| *H04L 9/32* | (2006.01) |
| *H04L 9/08* | (2006.01) |
| *G06F 21/33* | (2013.01) |
| *G06F 21/31* | (2013.01) |

(52) U.S. Cl.
CPC ............ *H04L 63/0884* (2013.01); *G06F 21/31* (2013.01); *G06F 21/335* (2013.01); *H04L 9/08* (2013.01); *H04L 9/0816* (2013.01); *H04L 9/3247* (2013.01)

(58) Field of Classification Search
CPC ....... G06F 21/31; G06F 21/33; G06F 21/335; G06F 21/62; H04L 9/08; H04L 9/0802; H04L 9/0816; H04L 9/0861
See application file for complete search history.

(56) References Cited

U.S. PATENT DOCUMENTS

| | | | |
|---|---|---|---|
| 7,085,931 B1 * | 8/2006 | Smith et al. | 713/182 |
| 8,190,771 B2 | 5/2012 | Schneider | |
| 2005/0015594 A1 * | 1/2005 | Ashley et al. | 713/168 |
| 2009/0300721 A1 | 12/2009 | Schneider | |
| 2013/0117554 A1 | 5/2013 | Ylonen | |

\* cited by examiner

*Primary Examiner* — Edward Zee
(74) *Attorney, Agent, or Firm* — Robert C. Kowert; Meyertons, Hood, Kivlin, Kowert & Goetzel, P.C.

(57) ABSTRACT

An escrow platform is described that can be used to enable access to devices. The escrow platform can be used to sign cryptographic network protocol challenges on behalf of clients so that the secrets used to sign cryptographic network protocol challenges do not have to be exposed to the clients. The escrow platform can store or control access to private keys, and the corresponding public keys can be stored on respective target platforms. A client can attempt to access a target platform and in response the target platform can issue a challenge. The client platform can send the challenge to the escrow platform, which can use the corresponding private key to sign the challenge. The signed challenge can be sent back to the client, which can forward it to the target platform. The target platform can verify the expected private key and grant access.

23 Claims, 8 Drawing Sheets

CRYPTOGRAPHIC KEY ESCROW

BACKGROUND

As an increasing number of applications and services are being made available over networks such as the Internet, an increasing number of content, application, and/or service providers are turning to technologies such as cloud computing. Cloud computing, in general, is an approach to providing access to electronic resources through services, such as Web services, where the hardware and/or software used to support those services are dynamically scalable to meet the needs of the services at any given time. A user or customer typically will rent, lease, or otherwise pay for access to resources through the cloud, and thus does not have to purchase and maintain the hardware and/or software to provide access to these resources.

Various services have been developed that enable a customer to adjust the compute capacity for an application or service in the cloud over time, making Web-scale computing easier for developers. In some cases, a Web service interface is provided that enables a customer to manage computing capacity, such as to obtain or boot new server instances in order to quickly scale capacity, both up and down, as computing requirements change.

Typically, access control of computing resources can be implemented using a cryptographic scheme, such as using asymmetric cryptography. Public and private key pairs can be generated for each user or at each time a user requests access to the computing resources. As the number of users or the number of requests grows, key management tends to become ever more difficult.

Accordingly, it is desirable to develop an improved systems, methods, and techniques for key management for access control of networked computer resources.

BRIEF DESCRIPTION OF THE DRAWINGS

The accompanying drawings, which are incorporated in and constitute a part of this specification, in connection with the description, illustrate various embodiments and exemplary aspects of the disclosed embodiments. In the drawings.

DETAILED DESCRIPTION

This document describes an escrow platform that can be used to enable access to devices. In an example embodiment, the escrow platform can be used to sign cryptographic network protocol challenges on behalf of clients so that the secrets used to sign cryptographic network protocol challenges do not have to be exposed to the clients. For example, the cryptographic network protocol can be the Secure Shell ("SSH") protocol and the secret can be a private key of a public key/private key pair. The escrow platform can store or control access to private keys, and the corresponding public keys can be stored on respective target platforms. A client can attempt to access a target platform according to the cryptographic network protocol and in response the target platform can issue a challenge. The client platform can send the received challenge (or information based at least in part on the received challenge) to the escrow platform, which can use the corresponding private key to sign the challenge (or information based at least in part on the received challenge). The signed challenge or information can be sent back to the client, which can forward it to the target platform. The target platform can verify that the expected private key was used to sign the challenge and grant access. Reference will now be made in detail to example embodiments, which are illustrated in the accompanying drawings and described in the following text and claims. When appropriate, the same reference numbers are used throughout the drawings to refer to the same or like parts.

In general, implementations consistent with the present teachings disclose a remote access procedure for one or more target platforms using an escrow platform. The escrow platform can be embodied as a hardware configuration or a software configuration. In addition, in some embodiments, the escrow platform can include or be associated with a web server that exposes a web service interface to the escrow platform, which can be accessible via a public Internet Protocol address ("IP address") (i.e., a public facing web service) and/or a private IP address (i.e., an internal web service; accessible within a private network such as a service provider network). When exposed as a web service, the escrow platform can provide an application programming interface ("API"), for example, a web API, through which other devices and/or services can communicate. The escrow platform can provide, via a web service, services including, but not limited to, cryptographic functionality, such as cryptographic key generation, key escrow, and digital signature functionality. The one or more target platforms can include a physical (i.e., physical computing platforms) or virtual machines (e.g. one or more instances) and can include heterogeneous assembly of network devices, including, but not limited to, servers, databases, switches, routers, etc.

Figure 1:
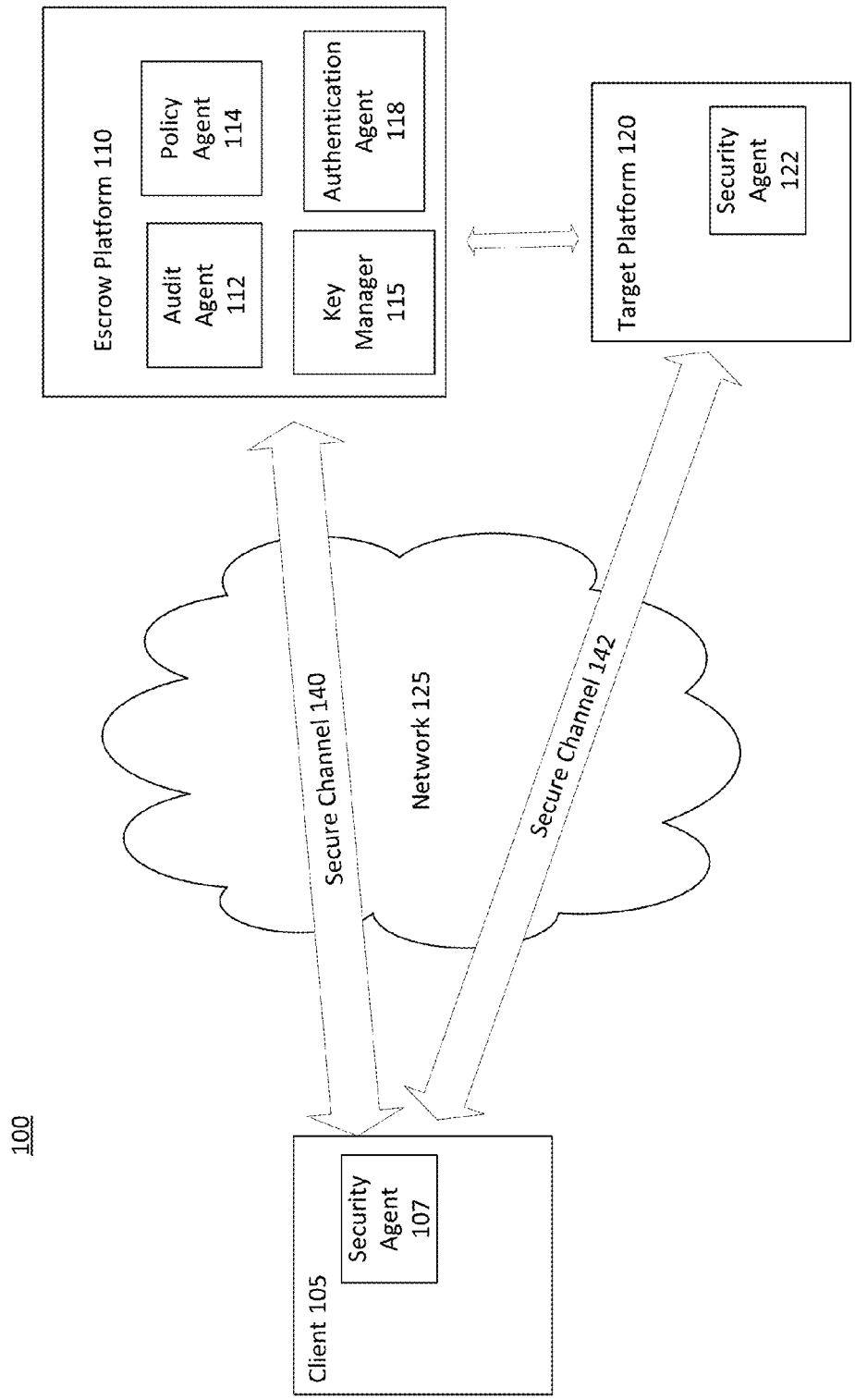
FIG. 1 illustrates an example of a network system with an escrow platform consistent with some disclosed embodiments.

FIG. 1 illustrates an example of a network system 100 with an escrow platform 110, consistent with the principles of the present disclosure. As shown, network system 100 includes a client computer 105, a target platform 120, and an escrow platform 110, which communicate via a network 125. The escrow platform 110 can optionally communicate with a server 115 (shown in FIG. 2) that can function as both a key manager that can provide functionality of a key generator and/or a key store. The client computer 105 can optionally communicate with another device or service (not shown) that can act on behalf of the client computer 105. For example, the client computer 105 can communicate with an intermediary device or service that provides services or functionality to/from the escrow platform 120 and/or the target platform 120.

In implementations, the client device 105 can be a computer, including, but not limited to, a desktop, a laptop, a tablet, or a smartphone device. The client device 105 can communicate with the target platform 120 and the escrow platform 110 using one or more application stored on the client device 105, including, but not limited to, a web browser with one or more application plugins, e.g., a Java software platform. The client device 105 can also include a security agent 107 that can function to establish or communicate with the escrow platform 110 and/or target platform 120 using a secure communication channel 140 and 142, respectively. For example, the secure communication channel 140 can be established once the client device 105 is authenticated by the escrow platform 110. The secure communication channel 140 can include, but is not limited to, communication using a secure socket layer (SSL) protocol. The secure communication channel 142 can be established between the client device 107 and the target platform 120 once the client device 105 is granted access to the target platform 120. For example, the security agent 107 can include a SSH client module that can communicate with the target platform 120 using the SSH protocol.

The target platform 120 can be one or more devices, such as devices similar to the client device 105, including, but not limited to a virtual machine instance, a database, a desktop computer system, a laptop computer system, a tablet, or a smartphone device, as well as a network device such as a switch or a router. The target platform 120 can include a security agent 122, for example, a SSH server module that can communicate with the client device 105 using the SSH protocol.

In implementations, the network 125 can include wired or wireless networks using one or more wireless technologies, such as infrared (IR), Near Field Communication, Zigbee, Bluetooth, IEEE standard 802.11(a), (b), (g), and/or (n), IEEE Standard 802.16 (WiMAx), Code Division Multiple Access (CDMA), Time Division Multiple Access (TDMA), GSM, and the like. In other implementations, the client and target platform may operate on different networks and there may be one or more intermediate networks used to transport traffic between devices.

In an example embodiment, the escrow platform 110 can be exposed as a web service to the client device 105 and the target platform 120. Thus, the escrow platform 110 can include or be associated with a programmatic interface (e.g., Web Service API) and/or customer-facing or user-facing interface. In various embodiments, when exposed as a web service, the escrow platform may be configured according to a web services model. For example, in some embodiments, the interface to the escrow platform may be accessible by clients as a web services endpoint having a Uniform Resource Locator (URL) to which web services calls generated by service clients (e.g., client device 105 and/or target platform 120) may be directed for processing. Generally speaking, a web service may refer to any type of computing service that is made available to a requesting client via a request interface (e.g., API) that includes one or more Internet-based application layer data transport protocols, such as a version of the Hypertext Transport Protocol (HTTP) or another suitable protocol.

Web services may be implemented in a variety of architectural styles, using a variety of enabling service protocols. For example, in a Representational State Transfer ("REST")-style web services architecture, the parameters that are pertinent to a web services call (e.g., specifying the type of service requested, user credentials, user data to be operated on, etc.) may be specified as parameters to the data transport command that invokes the web services call to the web services endpoint, such as an HTTP GET or PUT command. In some implementations, REST-style web services architectures are stateless, in that each web services call may contain all the information necessary to process that call without reference to external state information. In contrast to REST-style web services architectures, document-based or message-based web services architectures may encode the parameters and data pertinent to a web services call as a document that may be transmitted to a web services endpoint and then decoded and acted upon by the endpoint. For example, a version of eXtensible Markup Language ("XML") or another suitable markup language may be used to format the web services request document. In some embodiments, the markup language used to format the request document may delimit parameters that control the processing of the request, while in other embodiments certain features of the markup language itself may directly control aspects of request processing. Additionally, in some embodiments, the resulting document may be encapsulated within another protocol, such as a version of the Simple Object Access Protocol ("SOAP"), for example, in order to facilitate processing of the web services request by the endpoint.

Other protocols may also be employed within various embodiments of web services architectures. For example, a version of Web Services Description Language ("WSDL") may be employed by a web services endpoint to publish its interfacing requirements to potential clients. Web services endpoints may make themselves known to potential clients through a directory protocol such as a version of the Universal Description, Discovery and Integration ("UDDI") protocol. Numerous other types of protocols relating to the provision of computing services via web services interfaces may exist, and any given web services implementation may use any suitable combination of such protocols.

In some embodiments, the escrow platform 110 may support interfaces other than web services interfaces, instead of or in addition to a web services interface. For example, an enterprise may implement an escrow platform for use by clients external to the enterprise, who may access the service via web services protocols, as well as users within the enterprise, who may use a different type of interface (e.g., a proprietary interface customized to the enterprise's intranet). In some embodiments, an interface to the escrow platform 110 may support each of the various types of interfacing protocols through which any user of the escrow platform may access the service. In other embodiments, different instances of escrow web service may be provided with interfaces for each distinct interface approach. It is noted that in some embodiments, those aspects of an interface for the escrow platform 110 related to handling interactions with clients (e.g., receiving and responding to service requests) may be implemented separately from those aspects that implement the general architecture of the escrow platform (e.g., the generation and/or storage of cryptographic keys, the digital signature functionality, and client relationships, including client authentication). In some such embodiments, the portion of an interface to escrow web service relating to client interaction (e.g., via web services protocols) may be bypassed by certain users, such as those internal to an enterprise.

Figure 2:
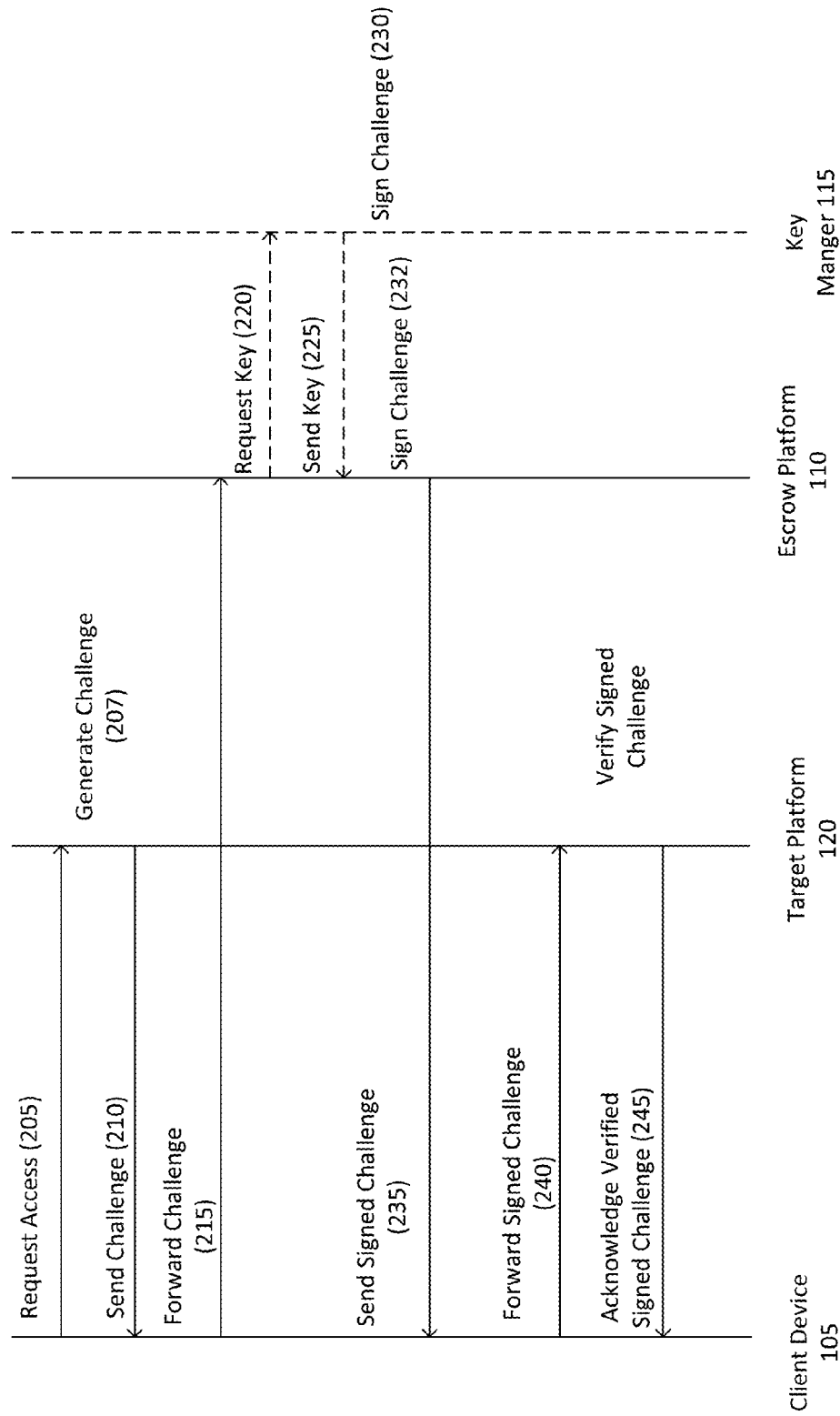
FIG. 2 illustrates a data traffic example of the network system of FIG. 1.

FIG. 2. shows a data traffic example for the network of FIG. 1. At 205, the client device 105 can send a request for access to the target platform 120 over the network 125. Alternatively, the client device 105 can provide the request through an intermediary device or service and the intermediary device or service can communicate over the network 125 or an internal network of an enterprise with the escrow platform 110 and/or the target platform 120 on behalf of the client device 105. At 207, the target platform 120 can generate a challenge and at 210, in response, the target platform 120 can provide a challenge to the client device 105. In implementations, the target platform 120 can include a hardware and/or a software-based challenge generator, such as a random or a pseudorandom generator that can produce a random string of alphanumeric characters. At 215, the client device 105 can then provide the challenge, or information based at least in part on the challenge, received from the target platform 120 to the escrow platform 110. In implementations, the client 105 can send a request including the challenge as well as additional information including, for example, but not limited to, information related to the client device 105, information related to the target platform 120, or both. In addition, in an embodiment the request sent from the client 105 can include authentication information for an identity (e.g., a user account identifier) of associated with the client device 105. The authentication information can include, but is not limited to, a properly formatted signed request that includes authorization information, a username, a password, or both. For example, the security agent 107 can generate a web services request (e.g., a GET request) that includes the challenge or information based at least in part on the challenge (e.g., the portion of the challenge that is used to generate the digital signature), an identifier for the target platform, as well as authentication information for the identity associated with the client device 105 that can be used by the escrow platform 110 to determine whether the user identity has the requisite permissions to access the target platform 120. Other types of authentication can also be used including, but not limited to, multifactor authentication that requires presentation of two or more authentication factors including a knowledge factor (something the user knows), a possession factor (something the user has), and an inherence factor (something the user is). Alternatively, the client device 105 can provide the authentication information separately from the challenge to the escrow platform 110. Once the client device 105 is authenticated by the escrow platform 110, a secure connection, such as the secure communication channel 140, between the client device 105 and the escrow platform 110 can be established. By way of a non-limiting example, the secure connection can include a secure socket layer (SSL) connection.

Continuing with the example illustrated in FIG. 2, the escrow platform 110 can be configured to process the request and determine which key is to be used to sign the challenge. For example, the escrow platform 110 can be operable to inspect the request to determine which target platform the client device 105 is attempting to access. The escrow platform 110 can query the authentication agent 118 to determine whether the identity associated with the request is authorized to access the target platform in question. Assuming the identity is authorized to access the target platform, the escrow platform 110 can be configured to determine which key to use to sign the challenge. For example, the escrow platform 110 can use information from the request to search a database for the appropriate secret to use to sign the challenge.

Continuing with the description of FIG. 2, if the key manager 115 is used, the escrow platform 110 can query the key manager 115 for a secret, such a private cryptographic key, at 220 and the key manager can provide the secret, i.e., the cryptographic key, at 225 and/or digitally sign the challenge using the secret at 230. If the key manager 115 is not used, the escrow platform 110 can use a secret, such as a private key, to sign the challenge at 232. In implementations where asymmetric cryptography is used, the escrow platform 110 can digitally sign the challenge or information based at least in part on the challenge using a private key for the target platform 120. In implementations where symmetric cryptography is used, the escrow platform 110 can digitally sign the challenge using a secret key. The escrow platform 110 can use any well know digital signature algorithms to sign the challenge or information based at least in part on the challenge to produce the digitally signed challenge. For example, the escrow platform 110 can generate a cryptographic hash of the challenge, using any well-known cryptographic hash functions, and can apply an RSA digital signature algorithm, using the private key, to produce the digital signature. Alternatively and/or additionally, the escrow platform 110 can generate a keyed-hash message authentication code (HMAC) where a message authentication code (MAC) is calculated using a cryptographic hash function in combination with a secret cryptographic key. Any conventional cryptographic hash function can be used, such as MD5 and SHA-1, can be used in the calculation of the HMAC, where the resulting MAC algorithm being HMAC-MD5 or HMAC-SHA1 depending on the particular hash function used. As shown by the figure, in some embodiments the escrow platform 110 may optionally request the appropriate key from a key manager 115. For example, the escrow platform 110 may not manage the secrets used to sign challenges; rather, the secrets could be stored in a key manager 115, such as a key management service or a hardware security device.

In some example embodiments, the escrow platform 110 may receive secrets and store them, whereas in other embodiments the escrow platform 110 or key manager 115 may generate the secrets. For example, the escrow platform 110 can create one or more cryptographic key pairs using a key generator 116. The one or more cryptographic key pairs can include a public/private asymmetric key pair or can be a symmetric secret key. The escrow platform 110 can be configured to generate a secret and associate the secret with the target platform 120 by storing a relationship in a database. The escrow platform 110 can then encrypt the secret and store it, e.g., by sending the secret to a key manager 115 that is configured to securely store the secret. In a specific example, when the secret is a public key/private key combination the escrow platform 110 can create an identifier for the private key and store it in a database in association with a target platform. The escrow platform 110 can then send the private key and the identifier for the key to the key manager 115. The key manager 115 can encrypt the private key and store information usable to locate the key in a database it uses. In an alternative configuration, the key manager 115 can generate the secrets. In this embodiment, the escrow platform 110 may request the key manager 115 to create the secret and receive back an identifier for the secret that it can store in its database in association with an identifier for the target platform.

In some embodiments, the secret may only be usable for a limited number of times. For example, the secret may be a one time key that can only be used for a particular session and that are destroyed after the session is completed or if the login is not successful.

Continuing with the description of FIG. 2, the signed challenge can be sent back to the client, as shown at operation 235. After the client device 105 receives the signed challenge, the client device 105 can then provide the signed challenge to the target platform 120 at 240. The target platform 120 can verify the digital signature of the signed challenge using a secret, e.g., a public key corresponding to a private key used to sign the challenge. If the digital signature is verified as authentic, then the target platform 120 can provide an acknowledgement to the client device 105 at 245. Once the digital signature is verified, connectivity can be established with the target platform 120. For example, a secure communication channel 142 can be established between the client device 105 and the target platform 120. By way of a non-limiting example, the secure connection between the client device 105 and the target platform 120 can include a connection using a SSH protocol. If the digital signature is not verified to be authentic, then target platform 120 can provide a denial of service message (not shown) to the client device 105 or not respond to the client device 105.

The general operational flow described above with respect to FIG. 2 can be supplemented with additional operations based on the type of target platform and the operational environment in which the escrow platform is deployed. For example, in some embodiments, a target platform may have to be provisioned with a secret used to verify a signed challenge because of how the target platform is architected. Example target platforms of this type may include networking equipment, such routers and switches that have an embedded security agent that are difficult or unpractical to modify as well as instance images (e.g., configuration files that, for example, specify different combinations of operating systems and applications to create virtual machines with). On the other hand, some types of target platforms may be capable of obtaining the secret over a network while they are in operation. These target platforms may have a network interface and logic configured to securely receive a secret used to verify a signed challenge; store the received secret; and make the secret available to logic operable to validate signed challenges. Example target platforms of this type includes computer systems, instances of virtual machines hosted by a service provider, or any other device that can be modified to include the logic described in the preceding sentence.

Figure 3:
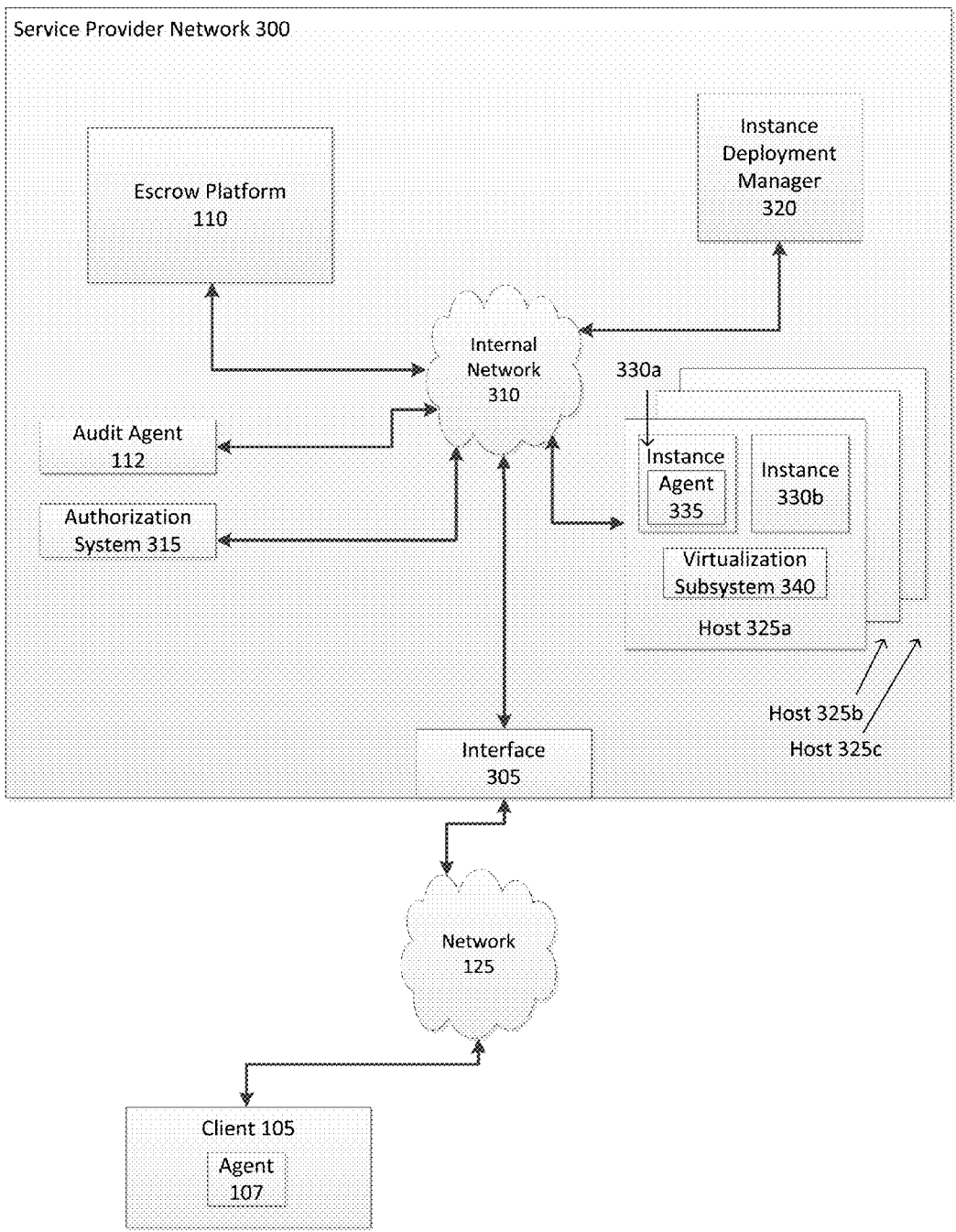
FIG. 3 illustrates an example of a service provider environment with an escrow platform in accordance with the present teaching.

Turning now to FIG. 3, it illustrates a service provider environment including an escrow platform. In this example, a user or customer of a compute service can use the escrow platform to securely access instances. For example, in implementations, the escrow platform 110 and/or the target platform 120 can be operated by one or more service providers. For example, a service provider could operate both the escrow platform and a compute service that allows users to use (e.g., rent) virtual machine instances on which to run their own computer applications and the target platform can be one of the virtual machine instances. The compute service can be accessed via a web service interface through which a user can launch one or more instances from one or more instance templates. The virtual machine or instance is a software implemented abstraction of the underlying hardware, which is presented to a running operating system or monolithic application.

For example, a user on client device 105 can request, over network 125, an instantiation of a virtual machine within service provider network 300. In implementations, the user can launch a web browser on the client device 105 and enter the web address of the service provider and interact with the service through a web console, which translates operations input by the user into the browser into corresponding API calls to an application programming interface (API), for example, a web API. Alternatively, the client device 105 can be configured to invoke the API programmatically. The client device 150 can request provisioning of one or more virtual machines or instances or access to one or more previously provisioned virtual machines or instances. Instances can be provisioned in advanced or can be provisioned upon receiving the request for access. Escrow platform 110 and target platform 120 (e.g., virtual machine or instance) can function in a similar manner as discussed above.

As shown in FIG. 3, service provider network 300 can include interface (e.g., the API described above) 305 with which client 105 can assess the services provided by service provider network 300. Client 105 can include agent 107 that can be invoked by a user to initiate interaction with service provider network, for example, over network 125. In an example embodiment, agent 107 can be part of an application (e.g., a standalone console or an application) or agent 107 can be executed within a browser. More specifically, agent 107 can be implemented as executable code that is downloaded to client device 105 and run within a web browser using a scripting computer language such as JavaScript. Interface 305 of service provider network 300 can be in communication with network 310, e.g., an internal network, which can be in communication with escrow platform 110, audit agent 112, authorization system 315, which can include authentication agent 118, instance deployment manager ("IDM") 320, and one or more hosts 325*a*, 325*b*, and 325*c* that can each host one or more instances (i.e., target platforms in this embodiment). Although FIG. 3 shows three hosts 325*a*, 325*b*, and 325*c*, this is merely one example and service provider network 300 can operate fewer or more hosts. Host 325*a*, 325*b*, and 325*c* can include one or more instances 330*a* and 330*b* and each instance can include an agent 335, i.e., agent 122. Virtualization subsystem 340 provides for the monitoring, administration, and maintenance of virtual machine instances it hosts.

Service provider network 300 can be used to provision an instance for a user. In one non-limiting example, a user, through client 105, can request a launch of an instance via an API or console over network 125. Upon receipt of the request from the client 105, IDM 320 of service provider network 300 can select a particular host from among hosts 325*a*, 325*b*, and 325*c* on which to provision the instance. In some implementations, a template or configuration file can be used to provide a basis for the features, e.g., operating system type/version, applications, processing, memory, and/or storage requirements, of the instance to be provisioned. In one example embodiment, the provisioned instance, the host on which the instance is provisioned, or IDM 320 can send a request to escrow platform 110 for generation of a secret, such as a public key/private key pair to use to enable the client 105 to access the instance. As described above, the request to generate a secret can be issued to escrow platform 110 in response to receipt of a challenge from a client. The key pair can be one-time-use keys that are destroyed after client device 105 has finished a session or failed to access the instance. In some implementations, escrow platform 110 can publish the public key to a public key directory that can be assessable by target platform 120. Once the secret is generated, and in the instance the secret is a public key/private key pair, the escrow platform 110 can provide the public key of the key pair to virtualization subsystem 340. Agent 335 running within the instance can make a call to a metadata service, e.g., a web service running in the virtualization subsystem 340, to request the public key and the web service can return the key to the agent 335. For example, the agent 335 can submit a web services request to an IP address that is resolved locally to the web service running in the virtualization subsystem 340.

In some implementations, the secret can be included with the instance at the time of provisioning. In this implementation, when the template is built, escrow platform 110 can be invoked to generate the secret and store it in the template. That way, when the template is used to generate the instance, the agent 335 already has access to it. For example, supposing the secret is a public key/private key combination, the public key can be stored or associated with the instance template and the private key can be managed by the escrow platform 110. When the instance launches the agent 335 will have access to the public key and can use it to verify signed challenges.

Service provider network 300 can then be used to provide access to the provisioned instance to user. By way of a non-limiting example, once the instance that is requested by the user is provisioned, a public IP address can be provided to the user to directly access the instance. The user can then use the IP address, and in conjunction, with agent 107, securely access the instance using SSH. In response, the instance initiates an authorization procedure to determine if client 105 has permission to access the instance by sending a challenge to client 105. The challenge provided by client device 105 can include information that identifies the target (e.g., instance) with which client device 105 would like to communicate.

Upon receiving the challenge at client 105, agent 107 sends an API request to escrow platform 110 using the public IP address of escrow platform 110. Escrow platform 110 digitally signs the challenge using the private key of the key pair that was generated for the instance and provides the digital signature to agent 107. Agent 107 forwards the digital signature to the instance to be verified using the associated public key of the key pair. Once the digital signature is verified, client 105 can access the instance using SSH and the IP address of the instance.

In another non-limiting example of the service provider network 300 providing access to the provisioned instance to the user, the client can access the instance via agent 107 running within the console. Browser code for the console, including the agent, is downloaded to client 105. Agent 107 is run in the browser and the console can include an icon, a button, or similar graphical activation representation in the console that allows client 105 to access the instance using SSH. In one implementation, the console can include a button labeled "SSH into instance." The user can select this button and the console can access the instance using SSH. In response, the instance initiates an authorization procedure to determine if client 105 has permission to access the instance by sending a challenge to client 105. Upon receiving the challenge at client 105, the console sends a request to escrow platform 110 via the public IP of escrow platform 110. Escrow platform 110 digitally signs the challenge using the private key of the key pair that was generated for the instance and provides the digital signature to the console. The console forwards the digital signature to the instance to be verified using the associated public key of the key pair. Once the digital signature is verified, client 105 can access the instance using SSH and the IP address of the instance. In this implementation of the authorization procedure, the user is not aware of the involvement of escrow platform 110.

In some implementations, the request by the client device 105 can additionally include authentication information, which can be verified by authentication agent 118 of escrow platform 110 or using a separate authentication agent separate from escrow platform 110. The authentication information can include identifying information of the owner or users permitted to access target platform 120 (i.e., instance). By way of a non-limiting example, the authentication can include the use of multifactor authentication that requires presentation of two or more authentication factors including a knowledge factor (something the user knows), a possession factor (something the user has), and an inherence factor (something the user is). The authentication request can be provided using a properly formatted web service request and can be digitally signed using a private key. The private key can be a part of a key pair that is created when the user initially subscribes to services provided by service provider network 300.

The escrow platform 110 can sign the challenge (or information based at last in part on the challenge) using the private key of the public key/private key pair. The public key can be provided to the instance 310. The digital signature and/or the challenge can be communicated to client device 105 through the secure communication channel 140 over the network 125 and/or can be provided to the instance 310 over the network 125. The client device 105 can then access the instance using the IP address directly using the secured communication channel 142 over the network 125, such as a secure shell (SSH) protocol connection. If the digital signature is not authentic, then the client device 105 can be informed of the denial to access the instance 310 and, optionally, can be instructed to retry by sending another request for access to the instance 310.

In implementations, the audit agent 112 of the escrow platform 110 can maintain statistical information about the client device 105, the target platform 120, and/or the users of the client device 105. The statistical information can include a historical account of past and present activity by the user or the client device 105. In some implementations, escrow platform 110 can provide audit logs to audit agent 112. The activity information can include, for example, but not is limited to, how often the user or the client device 105 attempts to access a target (e.g., instance 310), how often the attempts are successful, duration of each access, or types of targets accessed. The statistical information can provided, upon request by the user or the client device 105, in the form of an audit log.

In implementations, the escrow platform 110 can provide access by the user or the target platform 105 based upon a policy procedure maintained by policy agent 114. The policy procedure can be a flexible policy and be controlled by an administrator of the target (e.g., instance), escrow platform 110. The policy procedure can be consulted prior to client device 105 being granted access to target platform 120. For example, the policy procedure can be consulted by service provider network 300 or instance deployment manager 320 before the instance is launch. Additionally and/or alternatively, the policy procedure can be consulted by escrow platform 110 before signing the challenge. The policy procedure can be used to restrict access to certain users or a class of users, to certain target platforms or classes of target platforms, and can use one or more metrics. The one or more metrics can include, but are not limited to, a user-based, a target-based, or a temporal-based metric. By way of a non-limiting example, the policy procedure can allow a certain user or class of users to have access to a certain subset of targets only during certain time periods. The policy procure can allow another user or a class of users, for example, a user with a higher administrator-level privilege, to have priority access over other users or a class of users. Other types or conditions for the policy can be used. For example, users may be able to have access to a certain subset of targets, but not all the targets at the same time.

Figure 4:
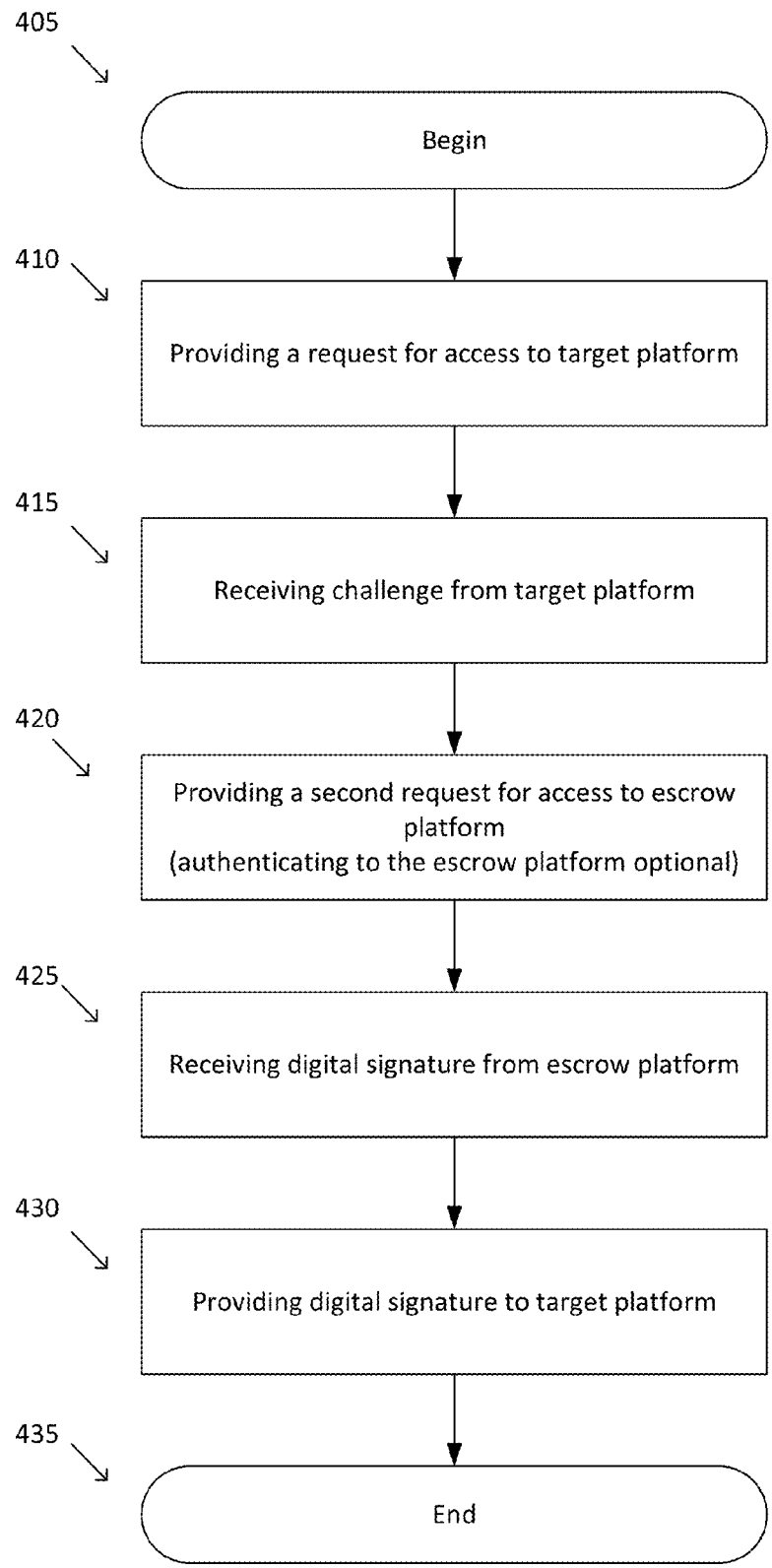
FIG. 4 shows an example of a method for accessing a target platform by a client device using an escrow platform in accordance with the present teachings.

FIG. 4 shows an example of a method for accessing the target platform 120 by the client device 105 using the escrow platform 110 in accordance with the present teachings. The method can begin at 405. At 410, the client device 105 provides a request for access to the target platform 120. At 415, the client device 105 receives a challenge from the target platform 120 in response to the request for access. At 420, the client device 105 provides a request to the escrow platform 110 for access to the target platform 120. In implementations, the request can comprise the challenge from the target platform 120 and an instruction to digitally sign the challenge. The instruction to digitally sign the challenge can include a request to use a particular cryptographic key and a specified digital signature algorithm. The request to the escrow platform 110 can also include authentication information. Alternatively, the client device 105 can pre-authenticate to the escrow platform 110. Once authenticated with the escrow platform 110, the client device 105 can communicate with the escrow platform 110 using a secure connection, such as a secure socket layer (SSL) connection.

At 425, the client device 105 receives the digital signature, challenge, and/or the signed challenge from the escrow platform 110. At 430, the client device 105 provides the digital signature, challenge, and/or the signed challenge to the target platform 120. The target platform 120 can authenticate the digital signature using a public key associated with the private key that created the digital signature and can provide an acknowledgment to the client device 105 that access has been granted. The client device 105 can then communicate with the target platform 120, for example, using a secure connection, such as a secure shell (SSH) protocol. Alternatively, the target platform 120 can provide a denial of service message to the client device 105 if the digital signature is not authentic. At 435, the process can end or return to the beginning at 405.

Figure 5:
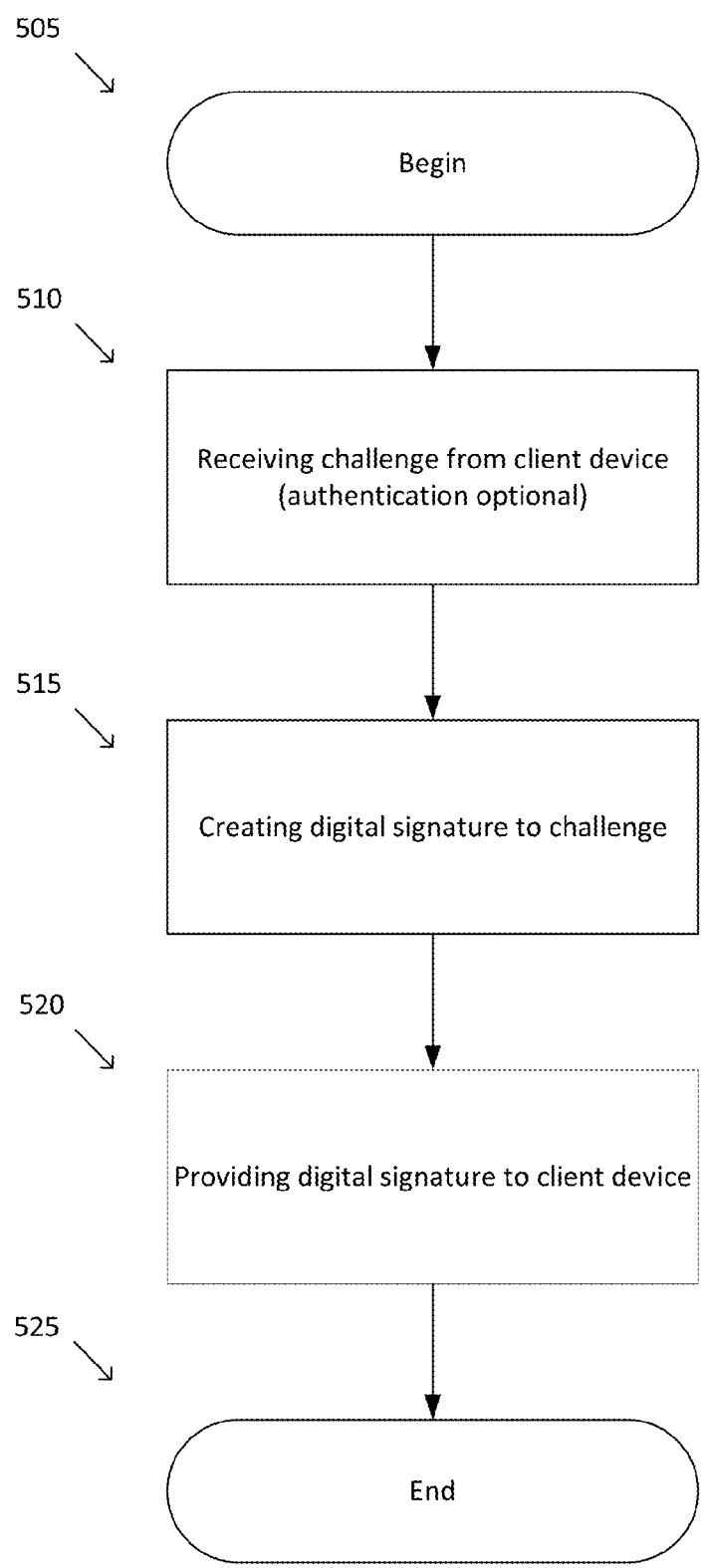
FIG. 5 shows an example of a method for connecting a client device to a target platform using an escrow platform in accordance with the present teachings.

FIG. 5 shows an example of a method for connecting the client device 105 to the target platform 120 using the escrow platform 110 in accordance with the present teachings. The method can begin at 505. At 510, the escrow platform 110 can receive a challenge from the client device 105. The challenge can be provided by the target platform 120 in response to the client device 105 requesting access to the target platform 120. In implementations, upon receiving the challenge, the escrow platform 110 can generate one or more cryptographic key pairs, for example, but not limited to, a public/private key pair. The challenge provided by the client device 105 can also include authentication information. Alternatively, the client device 105 can pre-authenticate to the escrow platform 110. Once authenticated with the escrow platform 110, the client device 105 can communicate with the escrow platform 110 using a secure connection, such as a secure socket layer (SSL) connection. At 515, the escrow platform 110 can create a digital signature for the challenge using the private key and a digital signature algorithm. The associated public key can be provided to or made available to the target platform 120, so that the target platform 120 can validate the digital signature. At 520, the escrow platform 110 can provide at least the digital signature to the client device 105. In implementations, the escrow platform 110 can also provide the challenge to the client device 105. At 525, the process can end or can return to the beginning at 505.

Figure 6:
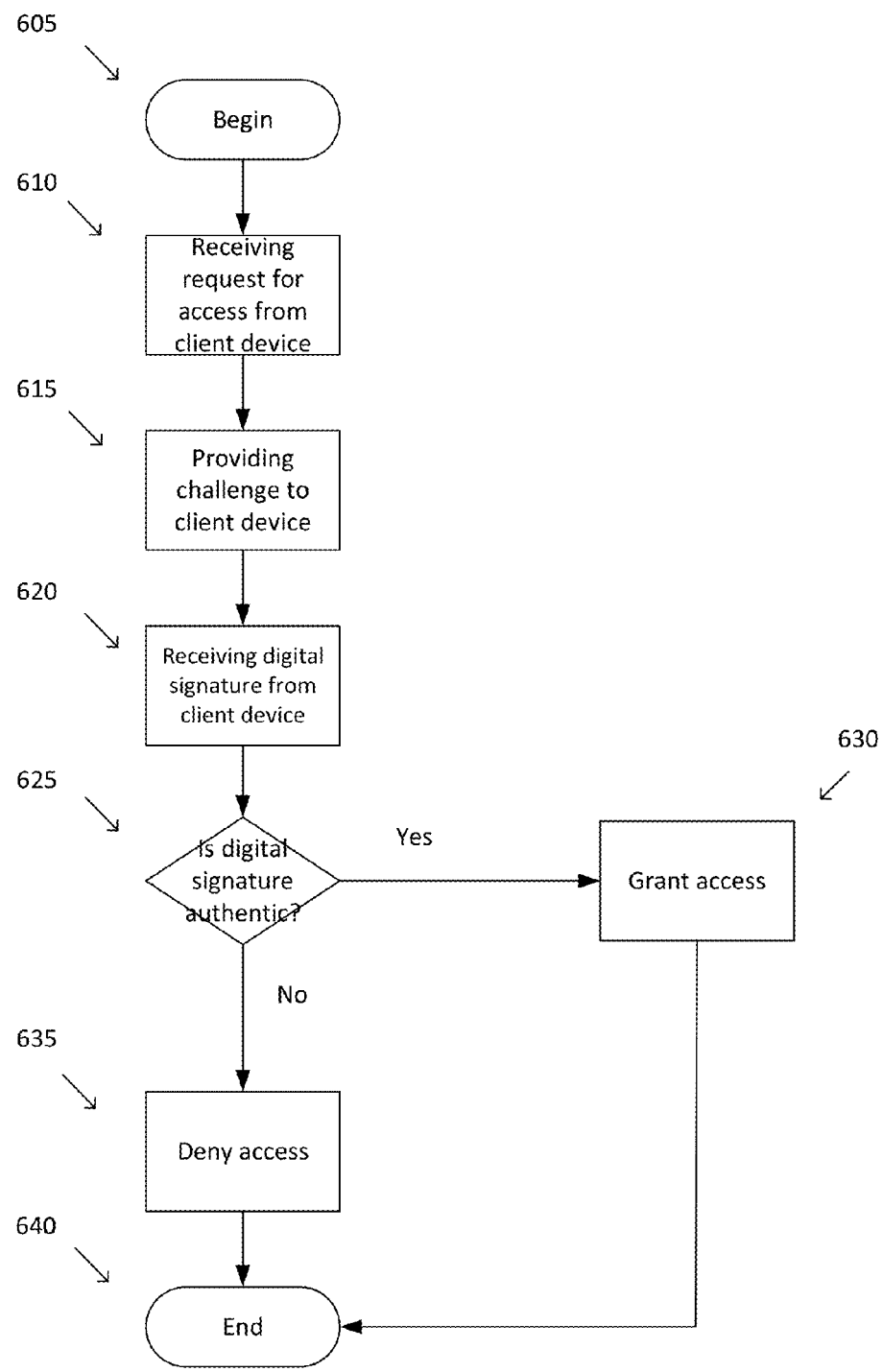
FIG. 6 shows an example of a method for accessing a target platform from a client device using an escrow platform in accordance with the present teachings.

FIG. 6 shows an example of a method for accessing the target platform 120 from the client device 105 using the escrow platform 110 in accordance with the present teachings. The method can begin at 605. At 610, the target platform 120 can receive a request for access from the client device 105. At 615, the target platform 120 can provide a challenge to the client device 105 in response to the request. At 620, the target platform 120 can receive a digital signature and/or the challenge from the client device 105. The digital signature of the challenge can be signed by the escrow platform 110 using a cryptographic key (e.g., private key) generated by the escrow platform 110 and a cryptographic signature algorithm. At 625, the target platform 120 can determine whether the digital signature is authentic using the public key associated with the private key that signed the challenge. At 630, if the result of the determination at 625 is positive (625, yes), meaning that the digital signature is authentic, the target platform 120 can grant access to the client device 105. At 635, if the result of the determination at 625 is negative (625, no), then the target platform 120 can deny access to the client device 105. At 640, the process can end or return to the beginning at 605.

Figure 7:
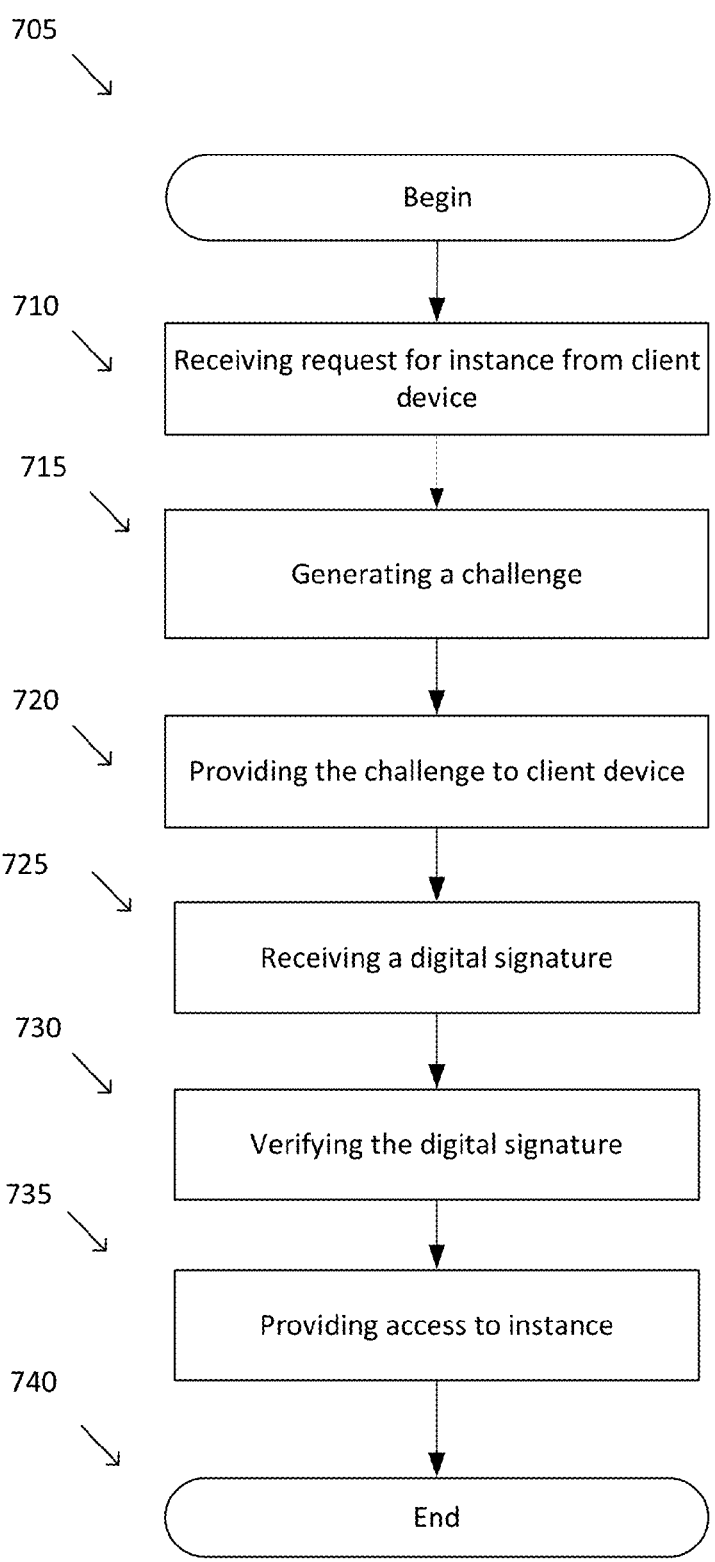
FIG. 7 shows an example of a method for providing access to the client device for an instance in a cloud-computing platform in accordance with the present teachings.

FIG. 7 shows an example of a method for providing access to the client device 105 for an instance 310 in a cloud-computing platform 310 in accordance with the present teachings. The method can be implemented using a non-transitory computer-readable medium that contains instructions that, when executed by a processor, perform the following operations. The method can begin at 705. At 710, an API 305, for example, a web API, of the cloud-computing platform 310 can receive a request to access or provision an instance for the client 105. At 715, a challenge can be generated in response to the request. For example, the request from the client device 105 can be provided to the API 305 by the security agent 107, which can then be forwarded to the provisioned instance 310. The provisioned instance 310 can generate a challenge to be provided to the client device 105 through the API 305 at 720.

The client device 105 can provide the challenge obtained from the instance 310 to the escrow platform 110. Additionally, the client device 105 can provide authentication information to the escrow platform 110 or the client device 105 can pre-authenticate with the escrow platform 110 before sending the challenge. Once the client device 105 is authenticated with the escrow platform 110, the client device 105 can communicate with the escrow platform 110 using a secured connection, such over the secure communication channel 140 over the network 125 using a secure socket layer connection. Upon receipt of the challenge, the escrow platform 110 can then generate one or more cryptographic key pairs to generate a digital signature using a digital signature algorithm. For example, the one or more cryptographic key pairs can include a public key/private key pair. The escrow platform 110 can use the private key of the generated key pair to produce the digital signature. The escrow platform 110 can also store the associated public key in the key store 116 and/or provide the associated public key to the instance 310.

At 725, the digital signature can be provided to the instance 310, which can verify the digital signature at 730. For example, the instance 310 can verify the digital signature using the public key associated with the private key that signed the challenge. At 735, authorization can be provided to access the instance via the API 305 to the client device 105 when the digital signature is verified as authentic. For example, an IP address of the instance 310 can be provided to the client device 105, and the client device 105 can use the IP address to communicate directly with the instance 310 using a secure communication protocol, such as over the secure communication channel 140 over the network 125 using a SSH protocol. At 740, the process can end or return to the beginning at 705.

Figure 8:
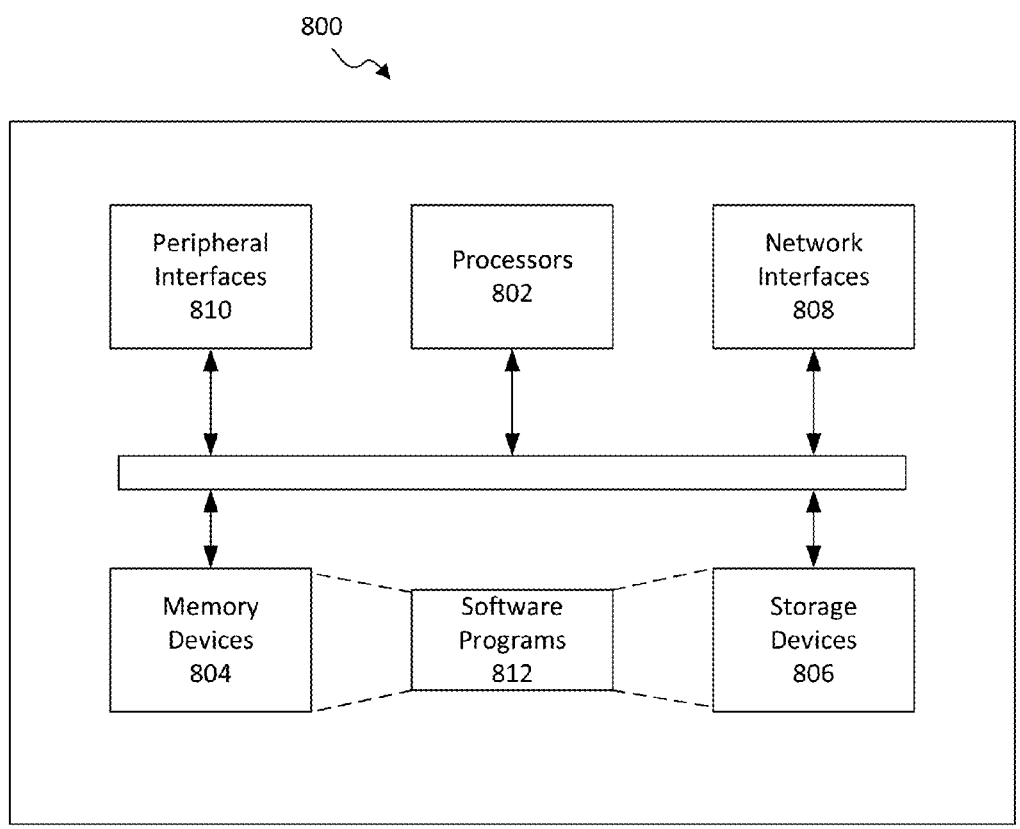
FIG. 8 is a diagram depicting an exemplary hardware configuration for a computing device, such as client device, escrow platform, or target platform, that may be used to perform one or more of the processes or implementations as described herein.

FIG. 8 is a diagram depicting an exemplary hardware configuration for a computing device 800, such as may be used to implement client device 105, escrow platform 110, or target platform 120, and that may be used to perform one or more of the processes as described herein. While FIG. 8 illustrates various components contained in computing device 800, one skilled in the art will realize that FIG. 8 is one example of a computing device and that additional components can be added and existing components can be removed.

As illustrated in FIG. 8, computing device 800 can include one or more processors 802 of varying core configurations and clock frequencies. Computing device 800 can also include one or more memory devices 804 that serve as a main memory during the operation of computing device 800. Computing device 800 can also include one or more peripheral interfaces 806, such as keyboards, mice, touchpads, computer screens, touchscreens, etc., for enabling human interaction with and manipulation of computing device 800.

Computing device 800 can also include one or more network interfaces 808 for communicating via one or more networks, such as Ethernet adapters, wireless transceivers, or serial network components, for communicating over wired or wireless media using protocols, such as Ethernet, wireless Ethernet, Global System for Mobile Communications (GSM), Enhanced Data rates for GSM Evolution (EDGE), Universal Mobile Telecommunications System (UMTS), Worldwide Interoperability for Microwave Access (WiMAX), Long Term Evolution (LTE), etc. Computing device 800 can also include one or more storage device 810 of varying physical dimensions and storage capacities, such as flash drives, hard drives, random access memory, etc., for storing data, such as images, files, and program instructions for execution by the one or more processors 802. One or more software programs 812 can be stored in the one or more memory devices 804 and/or on in the one or more storage devices 810. For example, the one or more software program can include an operating system, and any other software program utilized by computing device 800.

The computing device 800 can comprise one or more processor(s), which may comprise a microprocessor, microcontroller, digital signal processor, co-processor or other similar devices known to those having ordinary skill in the art. The applications described herein may be implemented as either software, firmware and/or hardware applications and may be implemented as a set of computer or machine-readable instructions stored in any type of non-transitory computer-readable or machine-readable storage medium or other storage device. Some non-limiting examples of non-transitory computer-readable mediums may be embodied using any currently known media such as magnetic or optical storage media including removable media such as floppy disks, compact discs, DVDs, BLU-RAY, flash memory, hard disk drives, etc. In addition, the storage device(s) as discussed herein may comprise a combination of non-transitory, volatile or non-volatile memory such as random access memory (RAM) or read only memory (ROM). One or more storage devices has stored thereon instructions that may be executed by the one or more processors, such that the processor(s) implement the functionality described herein. In addition, or alternatively, some or all of the software-implemented functionality of the processor(s) may be implemented using firmware and/or hardware devices such as application specific integrated circuits (ASICs), programmable logic arrays, state machines, etc.

In embodiments, the components of computing device 800 need not be enclosed within a single enclosure or even located in close proximity to one another. Those skilled in the art will appreciate that the above-described componentry are examples only, as computing device 800 can include any type of hardware componentry, including any necessary accompanying firmware or software, for performing the disclosed embodiments. Computing device 800 can also be implemented in part or in whole by electronic circuit components or processors, such as application-specific integrated circuits (ASICs) or field-programmable gate arrays (FPGAs).

For simplicity and illustrative purposes, the principles of the present teachings are described by referring mainly to exemplary embodiments thereof. However, one of ordinary skill in the art would readily recognize that the same principles are equally applicable to, and can be implemented in, all types of information and systems, and that any such variations do not depart from the true spirit and scope of the present teachings. Moreover, in the foregoing detailed description, references are made to the accompanying figures, which illustrate specific exemplary embodiments. Electrical, mechanical, logical and structural changes may be made to the exemplary embodiments without departing from the spirit and scope of the present teachings. The foregoing detailed description is, therefore, not to be taken in a limiting sense and the scope of the present teachings is defined by the appended claims and their equivalents.

The terms and descriptions used herein are set forth by way of illustration only and are not meant as limitations. For example, although methods has been described in top to bottom fashion, the steps of the method may be performed in a different order than illustrated or simultaneously. Furthermore, to the extent that the terms "including", "includes", "having", "has", "with", or variants thereof are used in either the detailed description or the claims, such terms are intended to be inclusive in a manner similar to the term "comprising." As used herein, the term "one or more of" with respect to a listing of items such as, for example, A and B, means A alone, B alone, or A and B. Those skilled in the art will recognize that these and other variations are possible.

What is claimed is:

1. A computer implemented method, comprising:
   receiving, by an escrow platform via an application programming interface (API) and over a network from a requestor, a subsequent request to access an instance, the subsequent request including a challenge generated by the instance in response to a prior request by the requestor to access the instance and the subsequent request including authentication information for the requestor, wherein the subsequent request is received by the escrow platform subsequent to the generation of the prior request by the instance;
   determining, by the escrow platform, that the requester is authorized to access the instance based on the authentication information included within the subsequent request;
   generating, by the escrow platform, using a private key associated with a public key on the instance, a digital signature for the challenge, wherein the digital signature is produced using a digital signature algorithm, at least information based at least in part on the challenge, and the private key; and
   providing the digital signature over the network to the requestor.

2. The computer implemented method of claim 1, further comprising generating, by the escrow platform, after receipt of a request to launch an instance within a service provider environment, the public key and the private key.

3. The computer implemented method of claim 1, wherein determining that the requestor is authorized to access the instance further comprises: determining that a policy set by an administrator of an account associated with the instance grants permission to the requestor to access the instance.

4. The computer implemented method of claim 1, further comprising:
   receiving an audit log request via the API from the requestor, wherein the audit log comprises information related to access granted to the requestor for the instance; and
   providing information from the audit log in response to the audit log request.

5. A non-transitory computer readable storage medium storing instructions that cause one or more processors of a client device to:

receive from a target platform, a challenge responsive to a request to access the target platform;

provide, to an escrow platform over a network, another request that comprises at least information based at least in part on the challenge received from the target platform;

receive over the network, from the escrow platform in response to the other request, a digital signature calculated using a secret associated with the target platform and at least the information based at least in part on the challenge;

provide to the target platform, at least the digital signature; and receive, after the target platform verifies the digital signature, an indication that access to the target platform was granted.

6. The non-transitory computer readable storage medium of claim 5, wherein the other request includes authentication information for an identity and wherein the computer readable storage medium further comprises instructions that cause one or more processors of the client device to: receive an indication that the escrow platform validated the authentication information.

7. The non-transitory computer readable storage medium of claim 5, wherein at least a portion of the instructions are browser executable instructions.

8. The non-transitory computer readable storage medium of claim 5, wherein the client device and the target platform communicate using a secure shell protocol once the client device is granted access to the target platform.

9. The non-transitory computer readable storage medium of claim 5, wherein the target platform is selected from the group consisting of: a virtual machine instance, a network switch device, and a network router device.

10. A system, comprising:
an escrow platform comprising:
one or more processors; and
a memory comprising instructions that, upon execution, cause the escrow platform to:
receive a request to sign a challenge over a network from a client device, the challenge generated by a target platform based on the client device requesting access to the target platform;
generate, by the one or more processors of the escrow platform, authenticity information, the authenticity information calculated using a secret associated with the target platform and information based at least in part on the challenge; and
provide at least the authenticity information over the network to the client device.

11. The system of claim 10, wherein the request to sign the challenge further comprises information usable to determine an identity of a user of the client device and wherein the memory further comprises instructions that, upon execution, cause the escrow platform to: authenticate the request to sign the challenge prior to generating a digital signature.

12. The system of claim 10, wherein the memory further comprises instructions that, upon execution, cause the escrow platform to:
generate a cryptographic key pair comprising a public cryptographic key and a private cryptographic key;
provide the public cryptographic key to the target platform; and
cause the private key to be stored.

13. The system of claim 12, wherein the memory further comprises instructions that, upon execution, cause the escrow platform to: generate the cryptographic key pair after receiving an indication that the target platform was launched.

14. The system of claim 12, wherein the memory further comprises instructions that, upon execution, cause the escrow platform to: generate the cryptographic key pair after receiving a request from a customer to access the target platform.

15. The system of claim 12, wherein the memory further comprises instructions that, upon execution, cause the escrow platform to:
record information indicating that the request to sign the challenge was received from the client device; and
provide notifications to an administrator, the notification based at least in part on the information indicating that the request to sign the challenge was received from the client device.

16. The system of claim 10, wherein the memory further comprises instructions that, upon execution, cause the escrow platform to: send instructions indicative of a client console to the client device, wherein the request to sign the challenge is received from the client-side console running on the client device.

17. The system of claim 10, wherein the memory further comprises instructions that, upon execution, cause the escrow platform to:
determine, based at least in part on the authenticity information, that the client device is authorized to access the target platform; and
authorize the request to sign the challenge based at least in part on the determination that the client device is authorized to access the target platform.

18. The system of claim 10, wherein the memory further comprises instructions that, upon execution, cause the escrow platform to: authorize the request to sign the challenge based at least in part on an evaluation of a policy set by an administrator of an account associated with the target platform that grants permission to the client device to access the target platform, wherein the policy indicates a limit on the number of target platforms accessible to a user identity associated with the client device within a given time period.

19. The system of claim 10, wherein the memory further comprises instructions that, upon execution, cause the escrow platform to:
receive an audit log request, wherein the audit log includes information indicating that access to the target platform was granted to the client device; and
provide the information in response to the audit log request.

20. The system of claim 10, further comprising:
a compute service including one or more computer systems, the computer systems including one or more processors and one or more memories that include instructions that upon execution implement the target platform and cause the compute service to:
prior to generation of the challenge, receive, from a requestor via an application programming interface (API), a request to provision an instance on the target platform; and
cause the instance to be launched on the target platform;
wherein the memory of the escrow platform further comprises instructions that upon execution cause the escrow platform to:
generate the secret, wherein the secret comprises a cryptographic key pair comprising a public cryptographic key and a private cryptographic key;
provide the public cryptographic key to the instance;
sign information based at least in part on the challenge received from the requestor, the challenge previously being generated by the instance after receipt of a request from the requestor to access the instance; and provide the signed information to the requestor; and wherein execution of the instructions of the compute service further cause the compute service to:

receive the signed information from the requester; and provide access to the instance based on a determination by the target platform that a digital signature of the signed information is valid.

21. The system of claim 20, wherein access is provided according to a policy procedure is checked before the challenge is signed.

22. The system of claim 20, wherein the policy procedure comprises a limit on a number of instances accessible to the requestor for a given time period.

23. The system of claim 20, wherein the policy procedure comprises a requirement that an administrator grant access to the requestor prior to said provide access to the instance.

* * * * *